June 19, 1923.
R. HUFF
1,459,304
SERVICE BRAKE
Filed Jan. 16 1920
2 Sheets-Sheet 1
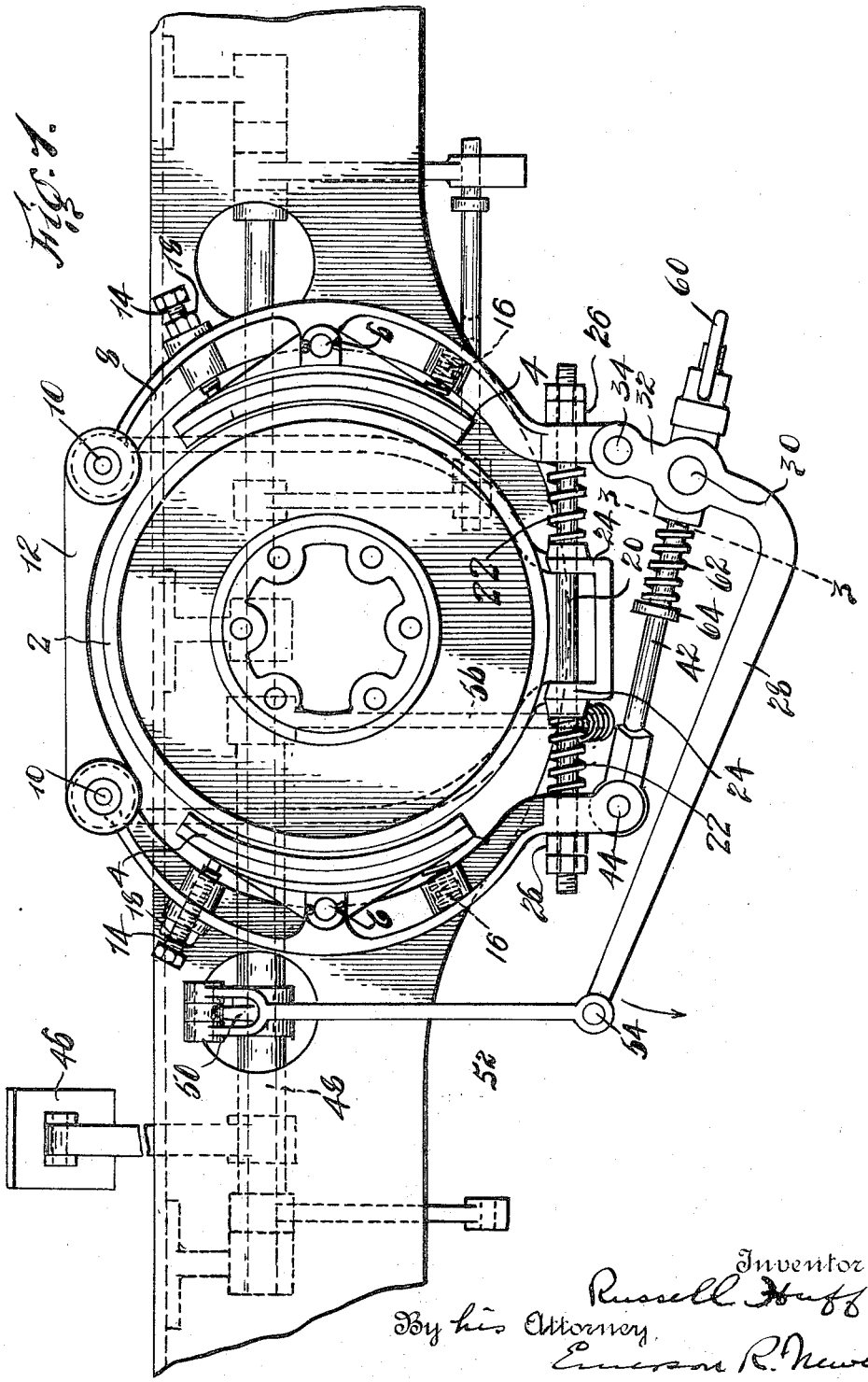
Inventor
Russell Huff
By his Attorney
Emerson R. Newell

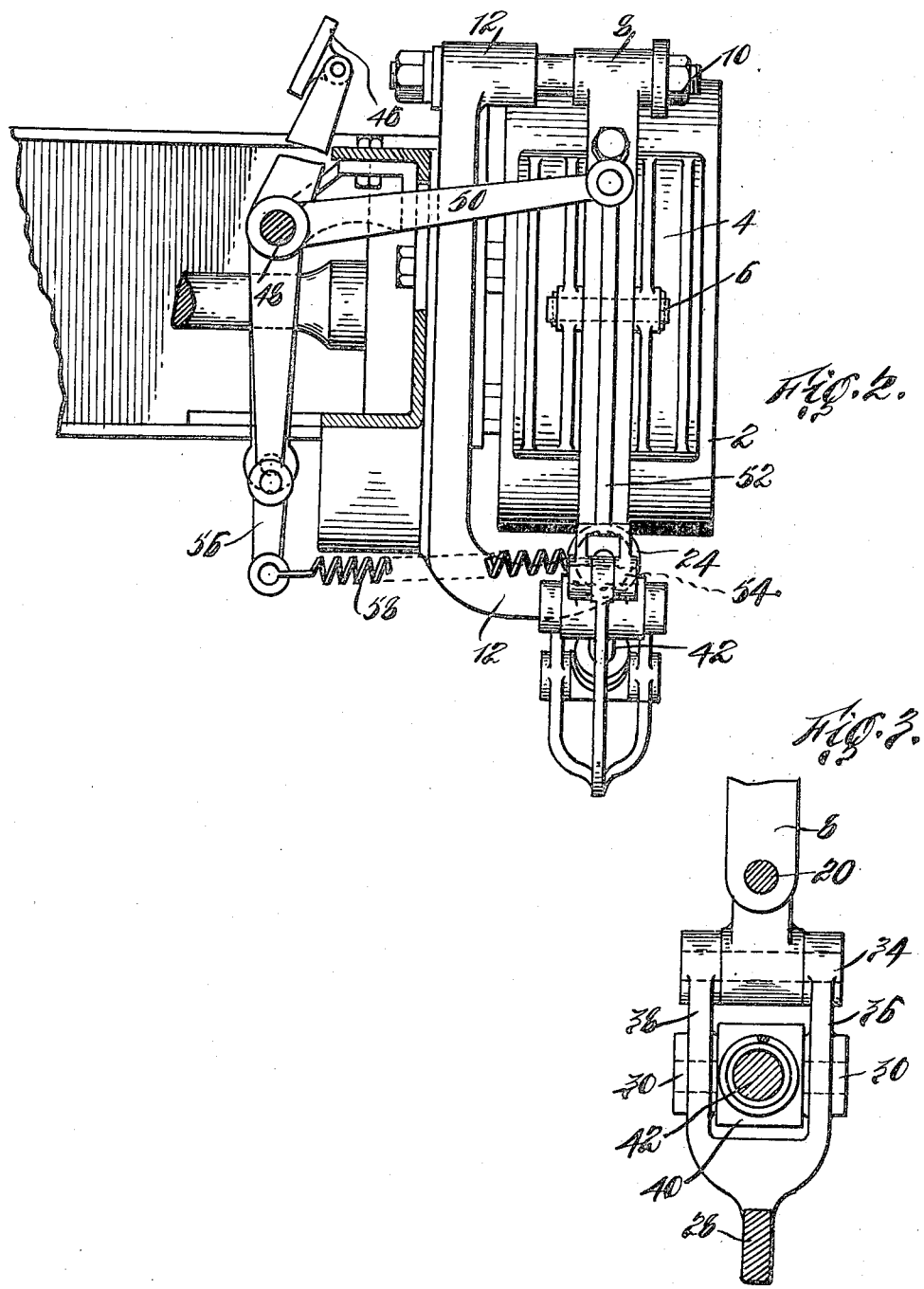

Patented June 19, 1923.

1,459,304

UNITED STATES PATENT OFFICE.

RUSSELL HUFF, OF DETROIT, MICHIGAN, ASSIGNOR TO DODGE BROTHERS, OF DETROIT, MICHIGAN, A CORPORATION OF MICHIGAN.

SERVICE BRAKE.

Application filed January 16, 1920. Serial No. 351,813.

*To all whom it may concern:*

Be it known that I, RUSSELL HUFF, a citizen of the United States, residing at Detroit, Michigan, have invented certain new and useful Improvements in Service Brakes, of which the following is a clear, full, and exact description.

This invention relates to brakes, and an object thereof is to improve the structure of such devices, particularly in regard to their adjustability, the parts to be adjusted being readily accessible.

In the accompanying drawings, in which one practical embodiment of the invention is shown;

Fig. 1 is an elevational view of the brake and those parts immediately cooperating therewith;

Fig. 2 is a side elevational view looking from the left of Fig. 1; and

Fig. 3 is a sectional view on the line 3—3, Fig. 1.

Referring to the drawings, 2 represents a part to be braked, this being usually in the form of a drum. Cooperating with the drum is a brake which may assume a variety of forms, but by preference I provide a brake consisting of two pivotally mounted members 4 symmetrically arranged with respect to the drum. These brake members, or brake shoes, 4 are pivoted at 6 to brake levers 8, pivoted at 10 in a frame 12. The brake shoes are each provided with adjustable means whereby they may be held in definite positions of adjustment. Any desired means may be used for this purpose, but I prefer to provide an adjusting means in the form of a screw 14 threaded into the brake lever 8 on one side of the pivot 6, and to provide a spring 16 which is seated in the brake lever 8 and bears against brake shoe, holding it in contact with the adjusting screw 14. It will thus be seen that any uneven wearing of the shoes may be compensated for by moving the screws 14 in or out. The screws are held in position by the usual lock nut 18.

The adjustment above described provides for rocking movement of the brake shoe about its pivot 6. In order, however, to adjust a shoe towards the drum to take up wear, and toward and from the drum to give it the proper initial adjustment, means are provided for moving the brake levers 8 on their pivots 10. In the preferred form of my invention, this may consist of a rod 20 fixed in the frame 12, and preferably in a bent-down portion thereof, said rod passing through openings in the ends of the levers 8. A spring 22 bears against each lever and against a portion 24 of the frame 12, this spring acting to rock the levers 8 on their pivots to thereby hold the brake shoes away from the drum. The ends of the rod 20 are threaded and are engaged by nuts 26 to secure the levers in their different positions of adjustment.

From the construction above described, it will be noted that a line drawn from the pivot 10 to the point of engagement of the end of a lever 8 with the rod 20 forms with said rod substantially a right angle. Therefore, as the levers 8 are moved to adjust the brake, there is very slight up and down movement of the ends of said levers in engagement with the rod 20, so that the openings in said levers through which the rod passes do not need to be large.

In the preferred form of my invention, the brake is applied by rocking the brake levers 8 on their pivots 10, and this rocking may be accomplished by providing a brake operating lever 28 pivoted on a floating fulcrum 30. Preferably also, a portion 32 of the lever 28 is pivotally connected to one lever 8 at 34. Referring to Fig. 3, it will be noted that the lever 28 is forked at 36 and 38, the pivots 30 and 34 being carried by the forks. Situated between the forks is a bushing 40, through which passes a rod or link 42, pivotally connected at 44 with the other brake lever 8.

To apply the brake, the lever 28 is rocked about its fulcrum 30 in the direction of the arrow, Fig. 1, said rocking being accomplished by a lever operating part situated beyond the brake operating lever 28. Said lever operating part may consist of the usual brake pedal 46, Fig. 2, which pedal may be connected to a rock shaft 48, to which is connected an arm 50 having at its end a link 52, which link is connected by a pin and slot connection 54 to the lever 28. A second arm 56 may also be connected to the rock shaft 48, and a spring 58 may connect said arm to any fixed part of the frame work of the vehicle to normally hold the brake lever operating part 46, and connections, in their normal positions. It will be understood that the brake pedal 46 is not necessarily situated as shown, as it would usually be placed at some distance from the brake, the showing being merely conventional for the purpose of making it clear how the brake pedal or similar device is operatively connected to the brake operating lever 28.

When said lever 28 is rocked, as above described, there will be a movement thereof either about the centre 30 or about the centre 34. If, for example, it is assumed that the rod 42 is fixed to the lever 28, as it might be, and if it is assumed that on movement of the brake operating lever the centre 30 remains fixed, then the point 34 will move to the left, Fig. 1, rocking the right hand brake lever 8 and shoe connected thereto about the point 10 as a centre, thereby causing the right hand brake shoe to engage the drum. As soon as movement of the point 34 towards the left is resisted by the brake shoe coming into contact with the drum, the lever 28 moves about the point 34 as a centre, thereby pulling on the link 42 and moving the left-hand brake shoe into contact with the drum.

With the construction thus far described, adjustment of the right-hand brake shoe towards the drum, by movement of the lever 8 along the rod 20, would have a tendency to move the point 34 towards the left, thereby rocking the lever 28 about its fulcrum 30. Likewise, an adjustment of the left-hand brake lever 8 towards the right along the rod 20 would result in a movement of the brake lever 28 about the point 34 as a centre, the link 42 pressing against the fulcrum 30. In either case, the lever 28 would have assumed a position with its left-hand end lower than normal position, resulting in the connections, including the brake pedal 46, being displaced from normal. Such a displacement is inconvenient in practice, because the brake pedal gradually gets nearer to the floor of the car and its free movement for braking action is lessened.

In order to compensate for the movement above described of the brake operating lever 28, due to the adjustment of the brake shoes towards the drum, I extend the rod 42 through the bushing 40, and provide threads on its outer end, which threads are in engagement with a winged nut 60 having a flat portion contacting with the bushing 40. A spring 62 is also interposed between the left-hand portion of the bushing 40 and an abutment 64 secured to the rod or link 42. Screwing up of the nut 60 will have the effect of moving the lever 28 to compensate for the adjustment of the brake towards the drum, such compensating action resulting in the floating fulcrum 30 being moved towards the left, Fig. 1, and in a shortening of the distance between said fulcrum and the point 44.

While I have shown and described a preferred embodiment of my invention, it is to be understood that variations may be resorted to within the scope thereof, and that parts of the invention may be used without others.

Having thus described my invention, what I claim as new and desire to secure by Letters Patent is:

1. In a device of the character described, in combination, a brake drum, a frame adjacent thereto, brake levers pivoted at one end in said frame, a brake shoe carried by each lever for cooperating with said drum, and a rod fixed relatively to said frame and passing through an opening in the other end of each of said levers and along which each is independently adjustable.

2. In a device of the character described, in combination, a brake drum, a frame adjacent thereto, brake levers pivoted at one end in said frame, a brake shoe carried by each lever for cooperating with said drum, and a rod fixed relatively to said frame and passing through an opening in the other end of each of said levers and along which each is independently adjustable, said rod at the point of meeting of said levers forming substantially a right angle with the line drawn from the pivot point of each of said levers, whereby a wide range of adjustment is permitted said brake with a relatively small opening in said levers, through which said rod passes.

3. In a device of the character described, in combination, a brake drum, a frame adjacent thereto, levers pivoted at one end in said frame, the pivot points thereof being symmetrical with respect to a diameter of said drum, a brake shoe on each lever, and a rod fixed relatively to said frame and extending at right-angles to said diameter, said rod engaging the other ends of said levers and along which rod they are each independently adjustable to effect adjustments of said brake shoes.

4. In a device of the character described, in combination, a brake drum, a brake therefor, a brake operating lever connected to the brake, a lever operating part beyond and connected to said lever, means for adjusting said brake toward said drum and consequently moving said brake operating lever and lever operating part, and means for adjusting the position of the fulcrum of said brake operating lever to compensate for the adjustment of said brake whereby said lever operating part is restored substantially to normal position.

5. In a device of the character described, in combination, a brake drum, a brake therefor, a brake operating lever connected to the brake and having a floating fulcrum, a lever operating part beyond and connected to said lever, means for adjusting said brake toward said drum and consequently moving said brake operating lever and lever operating part, and means for adjusting the position of the fulcrum of said brake operating lever to compensate for the adjustment of said brake whereby said lever operating part is restored substantially to normal position.

6. In a device of the character described, in combination, a brake drum, a pair of brake shoes cooperating with said drum, a brake operating lever, a floating pivot therefor, a connection from one end of said brake operating lever to one brake shoe, a connection from said floating pivot to said other brake shoe, means for adjusting said brake shoes and means for adjusting the position of the floating pivot of said brake operating lever to compensate for adjustment of said brake shoes.

7. In a device of the character described, the combination with a brake drum, of a brake therefor, including a pair of brake levers and brake shoes pivoted thereon, means for applying the brake, including a brake operating lever and a lever operating part, connections from said brake operating lever to said brake levers, means affording adjustment of said brake shoes on their pivots, means for adjusting said shoes toward said drum and consequently moving said brake operating lever and lever operating part, and means for adjusting the position of said brake operating lever to compensate for the adjustment of said brake shoes toward said drum whereby said lever operating part is restored substantially to normal position.

8. In a device of the character described, in combination, a brake drum, a frame adjacent thereto, brake levers pivoted at one end in said frame, a brake shoe carried by each lever for cooperating with said drum, a rod fixed relatively to said frame passing through an opening in the other end of each of said levers and along which each is independently adjustable, and resilient means supported by the rod and acting to move each lever independently to release its brake shoe.

Signed at Detroit, Michigan, this 3rd day of December 1919.

RUSSELL HUFF.

Witnesses:
J. R. FURSE,
ALFRED H. KNIGHT.